US011895956B2

(12) United States Patent
Ellis et al.

(10) Patent No.: US 11,895,956 B2
(45) Date of Patent: Feb. 13, 2024

(54) PLANT STAKE AND DISPLAY TAG HOLDER

(71) Applicant: ORORA VISUAL LLC, Buena Vista, CA (US)

(72) Inventors: Julie Ellis, Dallas, TX (US); Kevin Fitzpatrick, Winchester, VA (US)

(73) Assignee: Orora Visual LLC, Buena Park, CA (US)

( * ) Notice: Subject to any disclaimer, the term of this patent is extended or adjusted under 35 U.S.C. 154(b) by 219 days.

(21) Appl. No.: 17/562,951

(22) Filed: Dec. 27, 2021

(65) Prior Publication Data
US 2022/0201941 A1 Jun. 30, 2022

Related U.S. Application Data

(60) Provisional application No. 63/132,412, filed on Dec. 30, 2020.

(51) Int. Cl.
*G09F 3/04* (2006.01)
*A01G 9/02* (2018.01)
*A01G 9/00* (2018.01)
*A01G 9/12* (2006.01)

(52) U.S. Cl.
CPC .............. *A01G 9/006* (2013.01); *A01G 9/124* (2013.01)

(58) Field of Classification Search
CPC ............ A01G 9/006; A01G 9/02; G09F 3/206
See application file for complete search history.

(56) References Cited

U.S. PATENT DOCUMENTS

| | | | | |
|---|---|---|---|---|
| 4,027,410 A * | 6/1977 | Wheeler | ................. | G09F 3/206 40/645 |
| 4,972,616 A * | 11/1990 | Doll | ........................ | G09F 3/206 40/607.05 |
| 5,537,768 A * | 7/1996 | Tesselaar | ................ | G09F 3/206 40/668 |
| 6,105,293 A * | 8/2000 | Eason | .................... | A01G 9/006 40/658 |
| 6,199,319 B1 * | 3/2001 | Skinner | .................. | A01G 9/006 40/645 |
| 6,463,696 B2 | 10/2002 | Skinner | | |
| 8,240,073 B1 * | 8/2012 | Vulgamott | .............. | A01G 9/006 D20/26 |
| 10,939,622 B2 * | 3/2021 | Quinlan | .................... | G09F 3/02 |
| 2007/0256358 A1 * | 11/2007 | Schromm | ................ | A01G 9/02 47/66.6 |
| 2016/0165806 A1 * | 6/2016 | Ying | ........................ | A01G 9/006 24/67.11 |
| 2018/0014470 A1 * | 1/2018 | Quinlan | ................. | A01G 9/006 |
| 2019/0320592 A1 * | 10/2019 | Schuttler | ................... | G09F 3/08 |
| 2022/0201941 A1 * | 6/2022 | Ellis | ...................... | B65D 25/205 |

* cited by examiner

*Primary Examiner* — Shin H Kim
(74) *Attorney, Agent, or Firm* — Martin & Ferraro, LLP (57) ABSTRACT

A plant stake and display tag holder for use with a nursery container such as a pot or free-standing planter. The display tag is attached to the container and is accessible and visible to the consumer without obstruction from the container or plant contained therein. The bottom of the plant stake inserts into a slit in the rim portion of a nursery container and locks into place to hold the plant stake upright and securely in place. The display tag is held above the soil line and avoids the common problems associated with display tag holders inserted below the soil line.

20 Claims, 9 Drawing Sheets

PLANT STAKE AND DISPLAY TAG HOLDER

RELATED APPLICATIONS

This application claims the benefit of priority to provisional application Ser. No. 63/132,412 filed Dec. 30, 2020, incorporated by reference herein.

BACKGROUND

House and garden plants are typically grown in nursery containers or pots for holding soil and are then transported in the original containers to retail outlets for sale to the purchasers. Such plants that are sold through retail outlets and stores usually require suitable labels or tags to enable the purchaser to identify the plant variety as well as the price of the plant. Typical methods of providing identification of the plant include a stake or tag inserted into the soil of the container or pot holding the plant. The stake or tag generally includes a brief description of the plant, planting and care instructions, and a price or price code. The use of stakes which are inserted into the soil of the container or pot have the disadvantage of being easily separated from the plant and container during shipping and handling. This prevents the consumer from being able to easily identify the plant and cost of the plant.

Previous efforts to overcome the disadvantages of the use of the stakes inserted into the soil to identify the plants have resulted in shortcomings. For example, tags attached to the plant or the nursery container by a suitable fastener are usually difficult and more time consuming to attach than stakes inserted into the soil, thereby increasing labor costs. Similarly, tags attached to a container or pot below the soil line are difficult to change or add to a container while maintaining the plant stake in a fixed position relative to the container making access by a consumer difficult.

Accordingly, a continuing need exists for an improved plant stake and display tag holder for use with a nursery container or pot that overcomes the shortcomings of previous plant stakes and tags.

SUMMARY

The present invention is directed to a plant stake and display tag holder for use with a nursery container such as a pot or free-standing planter. The display tag is attached to the container and is accessible and visible to the consumer without obstruction from the container or plant contained therein.

In an embodiment, the plant stake and display tag holder includes a stem portion, a display tag, and a loop for connecting the display tag to the stem. The display tag preferably has an opening though which the tip of the loop is inserted and then the tip of the loop inserts into a locking mechanism to close the loop. The display tag freely moves along the closed loop and remains attached to the top of the plant stake. The bottom of the plant stake inserts into a slit in the rim portion of a nursery container and locks into place to hold the plant stake upright and securely in place.

The bottom of the stem portion is preferably arrow-shaped that is uniquely designed to flare out into two wing portions being angled relative to the longitudinal axis of the stem portions. After insertion into a slot of a nursery container, the configuration of the stem portion functions to lock in place and prevent movement of the display stake relative to the nursery container. Slits or openings in nursery containers can vary which can cause a display stake to be too loose and not stand up straight. This unique configuration solves this problem and holds the plant stake securely in place. The display tag is held above the soil line and avoids the common problems associated with display tag holders inserted below the soil line.

The unique configuration of the top of the plant stake that creates the loop solves at least two problems. First, it allows a display tag to move freely such that a consumer can easily view all sides of the display tag. Secondly, multiple display tags can be applied at the same time and does not restrict the user to only attaching one tag to each stake.

The plant stake and display tag holder is for use with a variety of shapes and sizes of nursery containers having a receiving slot, slit, or a similar suitable structure to receiving the bottom portion of the stem portion. The plant stake and display tag holder is attached to the container in a manner such that the display tag is readily visible by the purchasing consumer and the retailer without interfering with the plant or the container.

The plant stake and display tag holder is configured such that the display tag cannot be readily removed from the container without damaging the display tag and/or the plant stake and display tag holder.

The plant stake and display tag holder is convenient to use, easy to assemble and inexpensive to manufacture.

A nursery container typically has a bottom wall, and at least one side wall coupled to the bottom wall which extends in a substantially upward direction with respect to the bottom wall. The side wall has an upper end forming a rim portion with at least one slit formed therein. The display tag includes a printing area for receiving printed indicia, and an aperture for receiving the loop portion of the plant stake and display tag holder. The slit in the nursery container preferably has a length and a width, the width being less than it length. The wing portions are spaced apart to be greater than the width of the slit. The wing portions are flexible and can be flexed toward each other during insertion to fit into the opening of the slit. After having passed through the slit, the wing portions spring back to their un-flexed position to be spaced apart wider than the slit and bear upon the underside of the rim portion adjacent to the slit. This configuration prevents withdrawal of the plant stake and display tag holder from the slit and undesired removal.

An Example of an Embodiment of a Plant Stake for Holding a Display Tag for Use with a Plant Container Having an Insertion Slot, the Plant Stake and Display Tag Holder Comprising:

a stem having a top portion, a bottom portion, and a longitudinal axis passing therethrough, the bottom portion terminating at an insertion end configured to be inserted into the slot of the plant container, the insertion end having an arrow-shaped configuration with two wing portions, each of the wing portions being angled relative to the longitudinal axis of the stem and being at least in part flexible relative to the stem, wherein after insertion of the insertion end into the slot of the plant container the wing portions contact the plant container such that the insertion end holds the stem in an upright position and prevents movement of the stem relative to the plant container to hold the plant stake securely in place and lock into place to hold the plant stake upright and secured to the plant container; and a display tag holder including a loop portion for connecting at least one display tag to the stem, the loop portion extending from the top portion of the plant stake and terminating into a tip, the stem having an opening though which at least a portion of the tip of the loop portion is inserted into to form a closed loop proximate the top portion of the stem, and then the tip of the loop portion is inserted into the opening of a display tag before the loop is closed, the display tag freely moves along the closed loop and remains attached the plant stake.

The plant stake wherein the loop portion is flexible at least in part.

The plant stake wherein the stem includes a stop forming a shoulder having a dimension transverse to the longitudinal axis of the stem greater than a maximum dimension of the insertion slot of the plant container.

The plant stake wherein the display tag is held above the soil line of the plant container.

The plant stake wherein the stem includes a generally flat tab between the top portion and the bottom portion of the stem.

The plant stake wherein the stem includes a stop forming a shoulder between the tab and the insertion end of the stem.

The plant stake wherein the loop portion includes a stop between the top portion of the stem and the tip of the loop portion, the stop having a dimension larger than the opening in the stem portion.

The plant stake wherein the stem includes a locking mechanism and the tip of the loop portion inserts into the locking mechanism to close the loop portion.

The plant stake wherein the locking mechanism includes a tab for connecting with the loop portion and securing the loop portion to the stem when the loop portion is inserted into the opening of the stem.

The plant stake wherein the loop portion includes one or more ridges proximate the tip of the loop portion, the ridges configured to interdigitate with the tab of the locking mechanism.

The plant stake wherein the wings are oriented at an approximately 45 degree angle to the longitudinal axis of the stem.

The plant stake further comprising a display tag having a body portion with a front surface and a back surface opposite the front surface, the body portion including the opening for receiving the loop portion, at least a portion of at least one of the front surface and the back surface including a display area for containing viewable information.

The plant stake wherein the display area of the display tag includes a printing area for receiving printed indicia.

The plant stake wherein the insertion slot of the plant container has a length and a width, the width being less than its length and the wing portions of the stem are spaced apart greater than the width of the insertion slot, the wing portions being flexible toward each other during insertion to fit into the insertion slot and wherein after having passed through the insertion slot the wing portions spring back to their un-flexed position to be spaced apart wider than the insertion slot and bear upon an underside of the plant container adjacent to the insertion slot to prevent unwanted separation of the plant stake and display tag holder from the plant container.

The plant stake wherein the wing portions are oriented at an angle of approximately 30 to 60 degrees to the longitudinal axis of the stem.

The plant stake wherein at least a portion of each of the wing portions, respectively, being in a plane that is at angle to a plane passing through the longitudinal axis of the stem and the insertion end.

The plant stake wherein the at least a portion of the wing portions being in different planes, each said planes being at angle to the plane passing through the longitudinal axis of the stem and the tip.

The plant stake wherein the at least a portion of the wing portions being in the same plane, said plane being at angle to the plane passing through the longitudinal axis of the stem and the tip.

The plant stake further comprising at least one display tag secured to the stem by the loop portion.

The plant stake further comprising a plurality of display tags secured to the stem by the loop portion.

BRIEF DESCRIPTION OF THE DRAWINGS

The accompanying drawings, which are included to provide further understanding of the present invention disclosed in the present disclosure and are incorporated in and constitute a part of this specification, illustrate aspects of the present invention and together with the description serve to explain the principles of the present invention. In the drawings.

DETAILED DESCRIPTION

The detailed description set forth below is intended as a description of various configurations of the present invention and is not intended to represent the only configurations in which the present invention may be practiced. It will be apparent, however, to those of ordinary skill in the art that the present invention is not limited to the specific details set forth herein and may be practiced without these specific details.

Referring to the Figures, an embodiment of a plant stake and display tag holder assembly 10 is shown. Plant stake and display tag assembly 10 includes a stem 20, a display tag 30, and a loop 40 connecting the display tag 30 to stem 20. Plant stake and display tag assembly 10 is shown attached to a nursery container C which is a container such as a pot for holding nursery items such as plants, flowers, and the like normally offered for sale in a nursery or a garden department of a home improvement store. Container C can include potting soil D for example.

Figure 4:
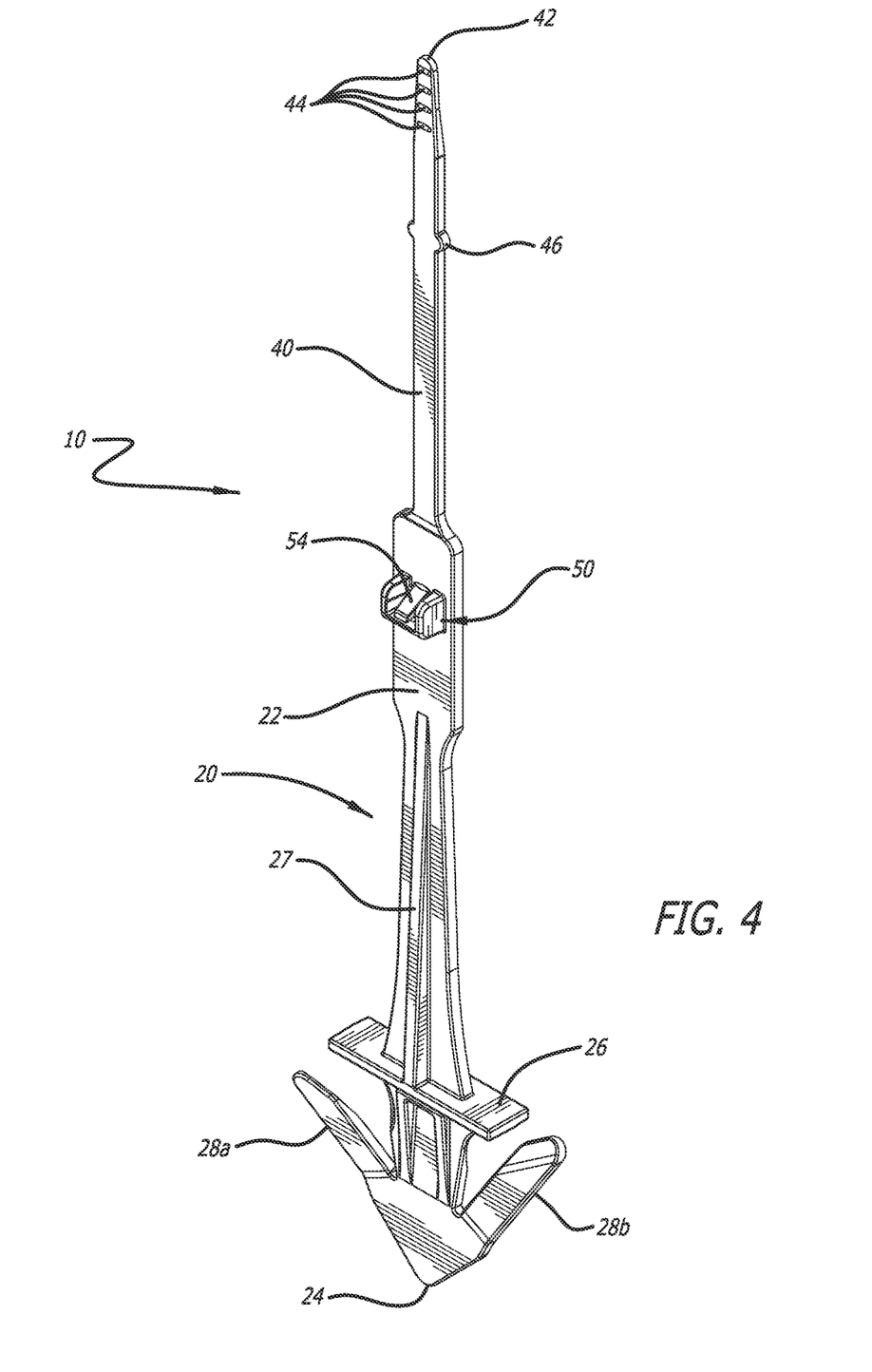
FIG. 4 is a front, top and right perspective view of the plant stake and display tag holder in accordance with an embodiment of the present invention.
Figure 5:
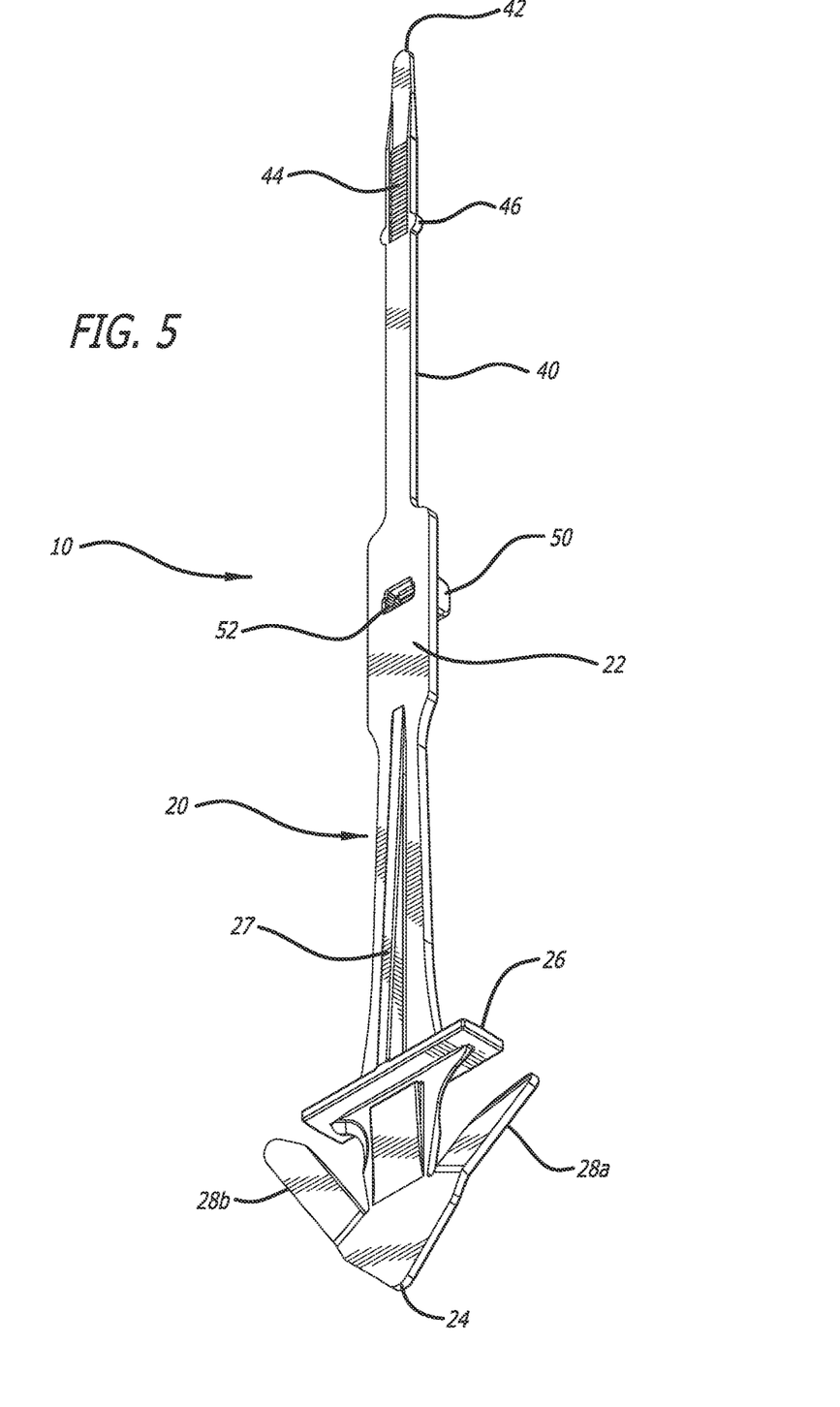
FIG. 5 is a rear, bottom and right perspective view of the plant stake and display tag holder in accordance with an embodiment of the present invention.
Figure 6:
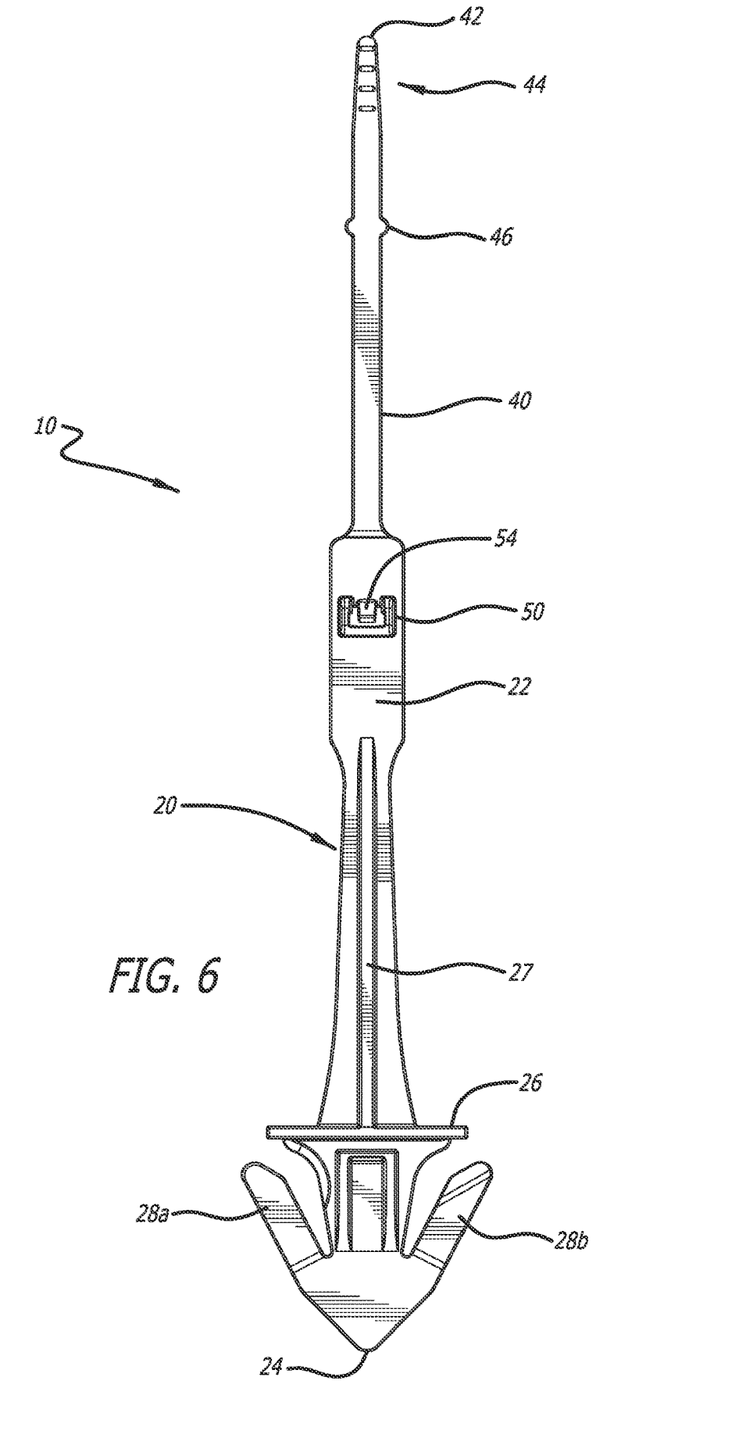
FIG. 6 is a rear elevation view of the plant stake and display tag holder in accordance with an embodiment of the present invention.
Figure 7:
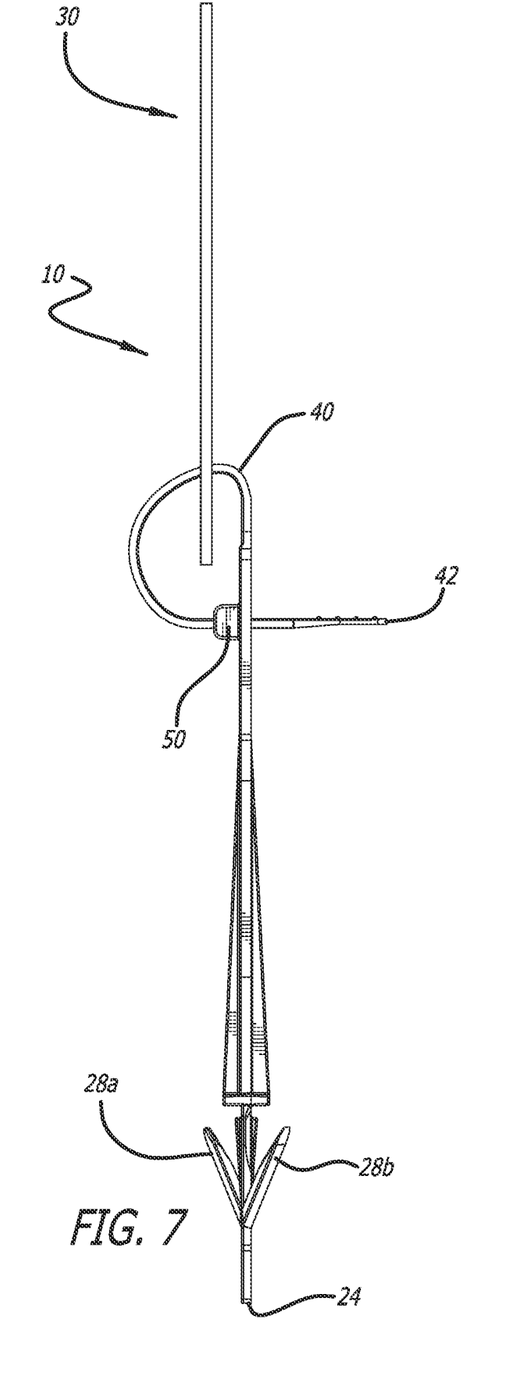
FIG. 7 is a right side elevation view of the plant stake and display tag holder in accordance with an embodiment of the present invention with the display tag in the lifted position.
Figure 8:
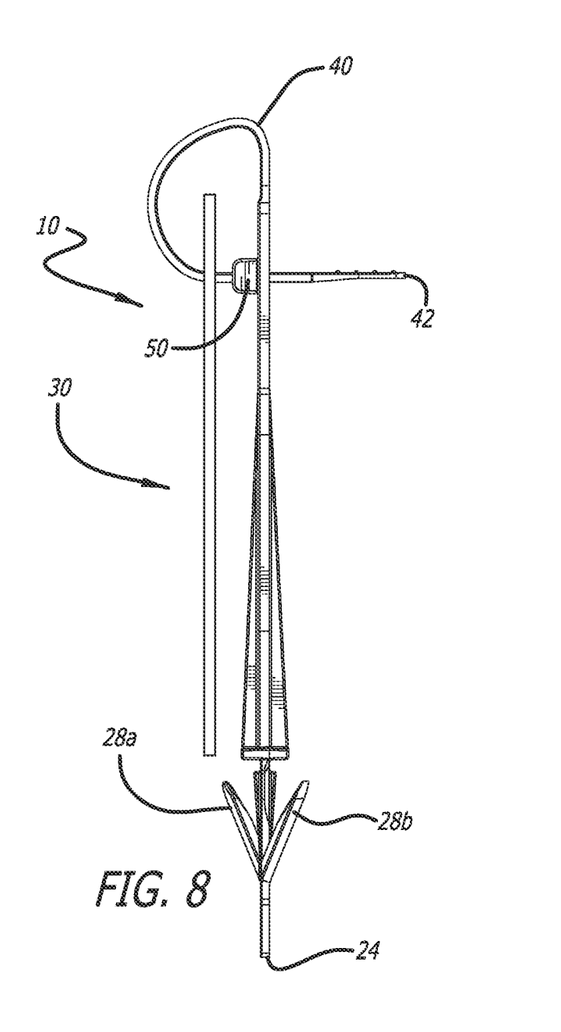
FIG. 8 is a right side elevation view of the plant stake and display tag holder in accordance with an embodiment of the present invention with a plant tag in the normal resting position.

As shown in FIGS. 4-6, stem 20 preferably comprises a flat tab 22 at one end and a tip 24 at its opposite insertion end. Tip 24 preferably has an-arrow shaped configuration. A stopper 26 is located between tip 24 and flat tab 22 and forms a shoulder to prevent further advancement of stem 20 when inserted into a slit S of container C. A reinforced structure such as ribs 27 may be present along at least a portion of flat tab 22 to provide further structural rigidity to stem 20.

Tip 24 preferably comprises wings 28a and 28b extending from its sides in a lateral direction of tip 24. Wings 28a and 28b are oriented preferably at an angle to the longitudinal axis of stem 20 in order to provide a more secure engagement with container C when inserted therein as described further below. In an embodiment, the wings are oriented at an angle of approximately 30 to 60 degrees and preferably at an approximate 45 degree angle to the longitudinal axis of stem 20. At least a portion of each of wings 28a and 28b, respectively, being in a plane that is at angle to a plane passing through the longitudinal axis of stem 20, tab 22, and tip 24. Preferably, the angled portions of wings 28a and 28b being in different planes or alternatively in the same plane, each said planes being at angle to the plane passing through the longitudinal axis of stem 20, tab 22, and tip 24.

Extending from the opposite end of flat tab 22 is a loop 40 terminating in an end 42 including one or more ridges 44 on at least one surface of loop 40. Shoulder stop 46 preferably is located proximate ridges 44 along the sides of loop 40. A locking mechanism 50 is present on flat tab 22 and is adapted to receive end 42 of loop 40 inserted therein. Locking mechanism 50 includes a receiving aperture 52 and a tab 54. Tab 54 interdigitates with ridges 44 of loop 40 to prevent unwanted removal of loop 40 from within locking mechanism 50 once inserted. In this manner, loop 40 in cooperation with the locking mechanism 50 is securely fastened to stem 20.

Figure 1A:
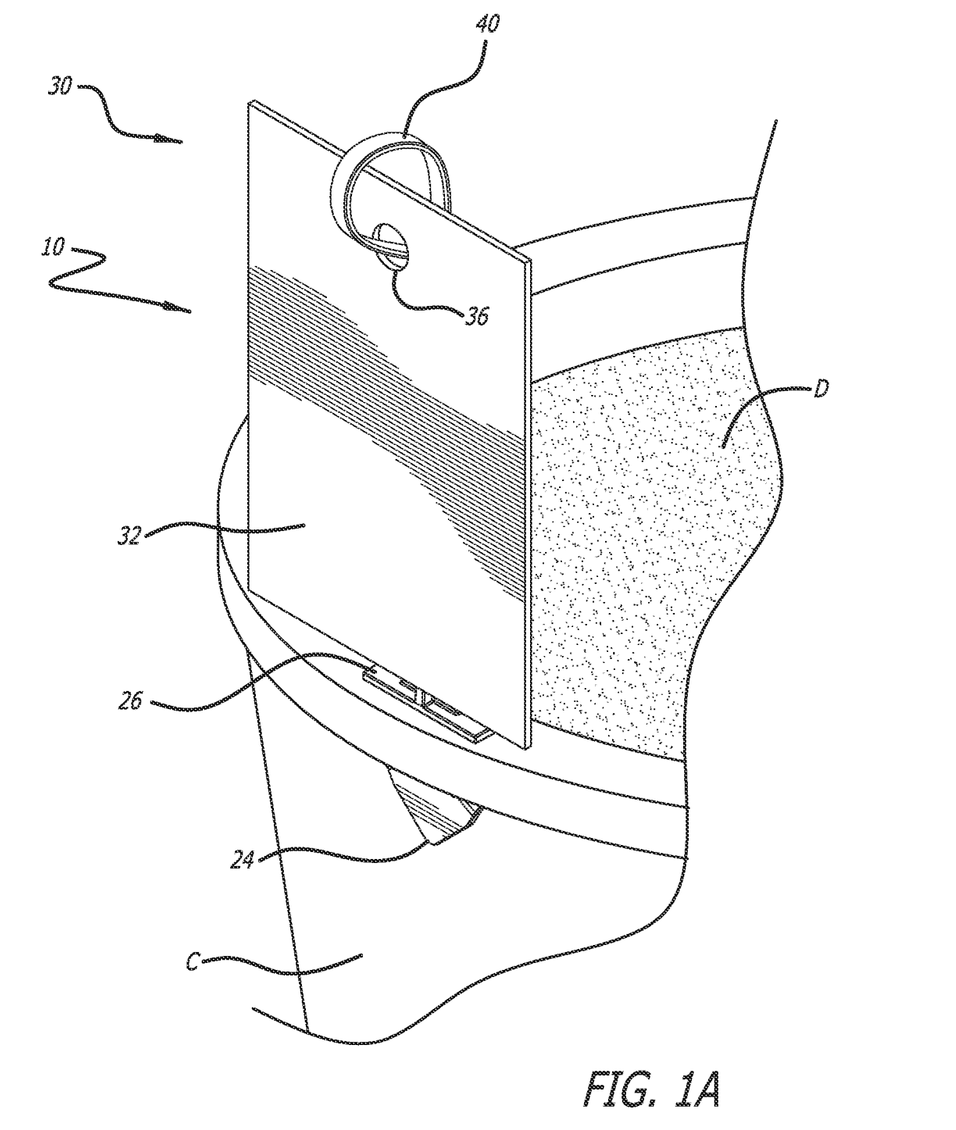
FIG. 1A is a front, top and right perspective partial view of the plant stake and display tag holder in accordance with an embodiment of the present invention inserted in a slot of a plant container with a display tag in a normal resting position.

Referring to FIG. 1A, loop 40 is shown passing through display tag 30 having an aperture 36 therein and display tag 30 is shown hanging in a downward position to be freely movable by the user. Display tag 30 has a front 32 and an opposite back 34. Front 32 normally would include information easily viewable by a potential customer describing the plant or other contents of the container C. Back 34 may also contain additional information descriptive of the plant or associated with the application and care thereof as desired by the manufacturer. As shown, display tag 30 includes a flat planar body portion defining a printing area for receiving printed information. The printing area can include information relating to the identity of the plant, care instructions and price codes. In an embodiment, display tag 30 has a substantially rectangular shape. In other embodiments, display tag 30 can be square, circular or other suitable shapes. Display tag 30 can be made of any suitable material for labels. Preferably, display tag 30 is a plastic material that is sufficiently rigid to retain its shape while being flexible to bend and spring back to its original shape.

Figure 1B:
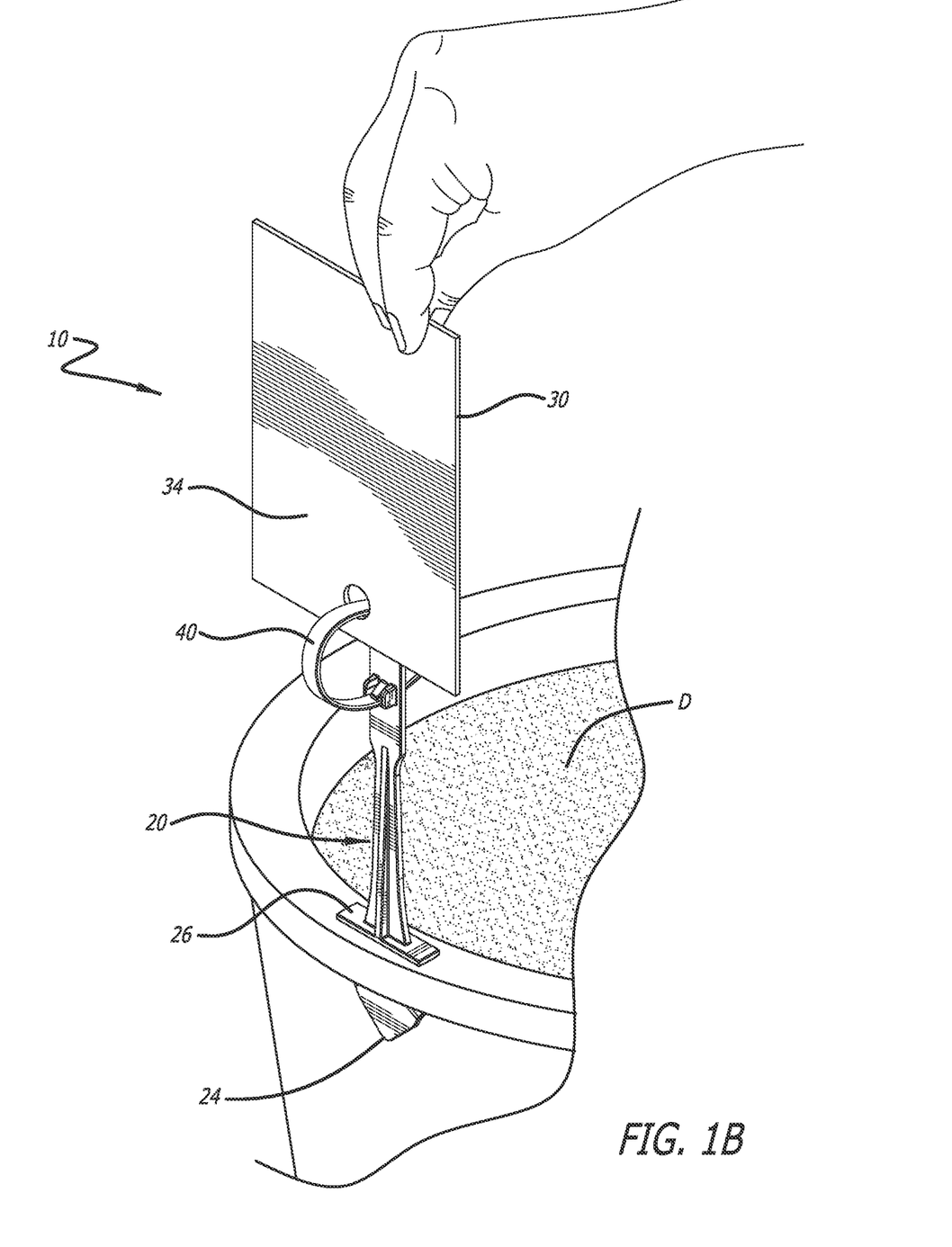
FIG. 1B is a front, top and right perspective partial view of the plant stake and display tag holder in accordance with an embodiment of the present invention inserted in a slot of a plant container with a display tag being held in a lifted position.

In FIG. 1B, display tag 30 is shown in a lifted position which reveals back 34 of display tag 30. Display tag 30 is securely attached to plant stake display assembly 10 and cannot be removed by the consumer as it is locked by the loop 40 inserted into the locking mechanism 50.

Figure 2:
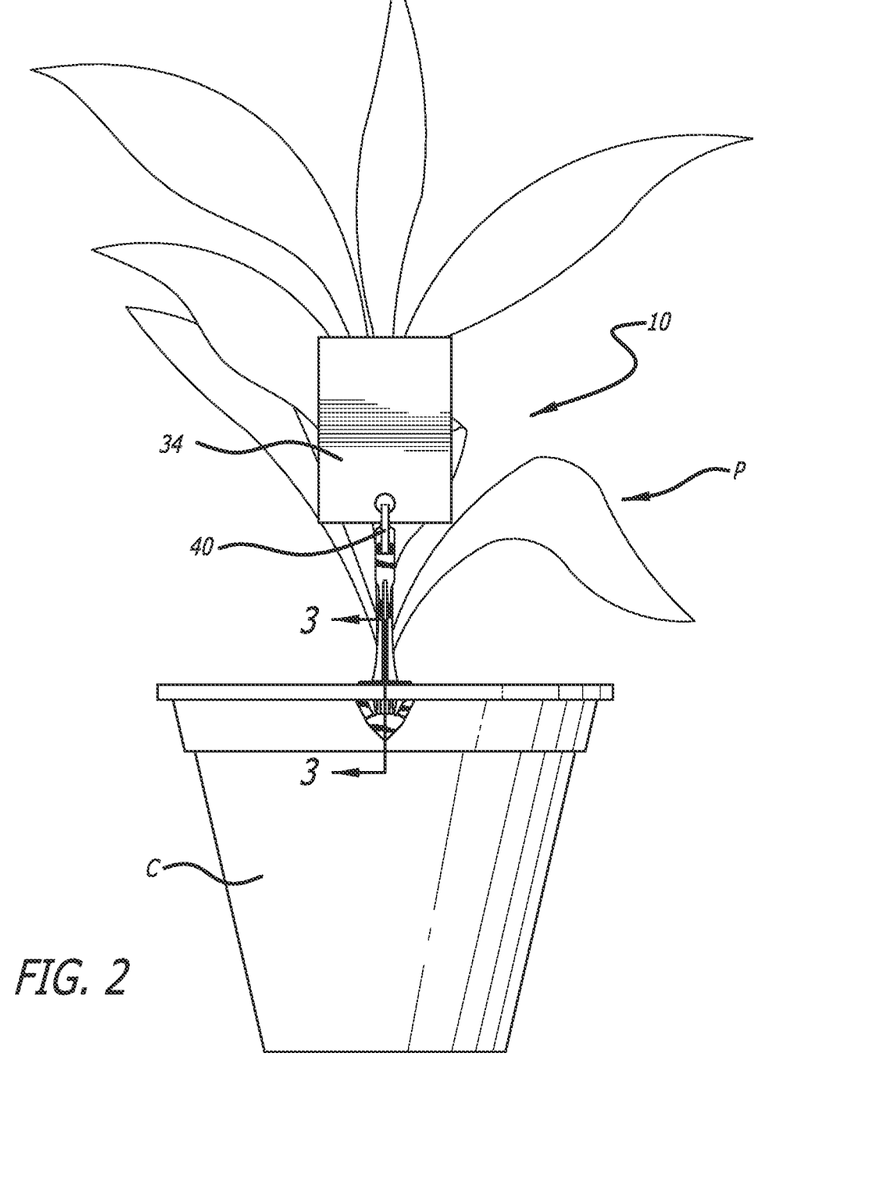
FIG. 2 is a front elevation view of the plant stake and display tag holder in accordance with an embodiment of the present invention inserted in a slot of a plant container with a display tag being held in a lifted position.
Figure 3:
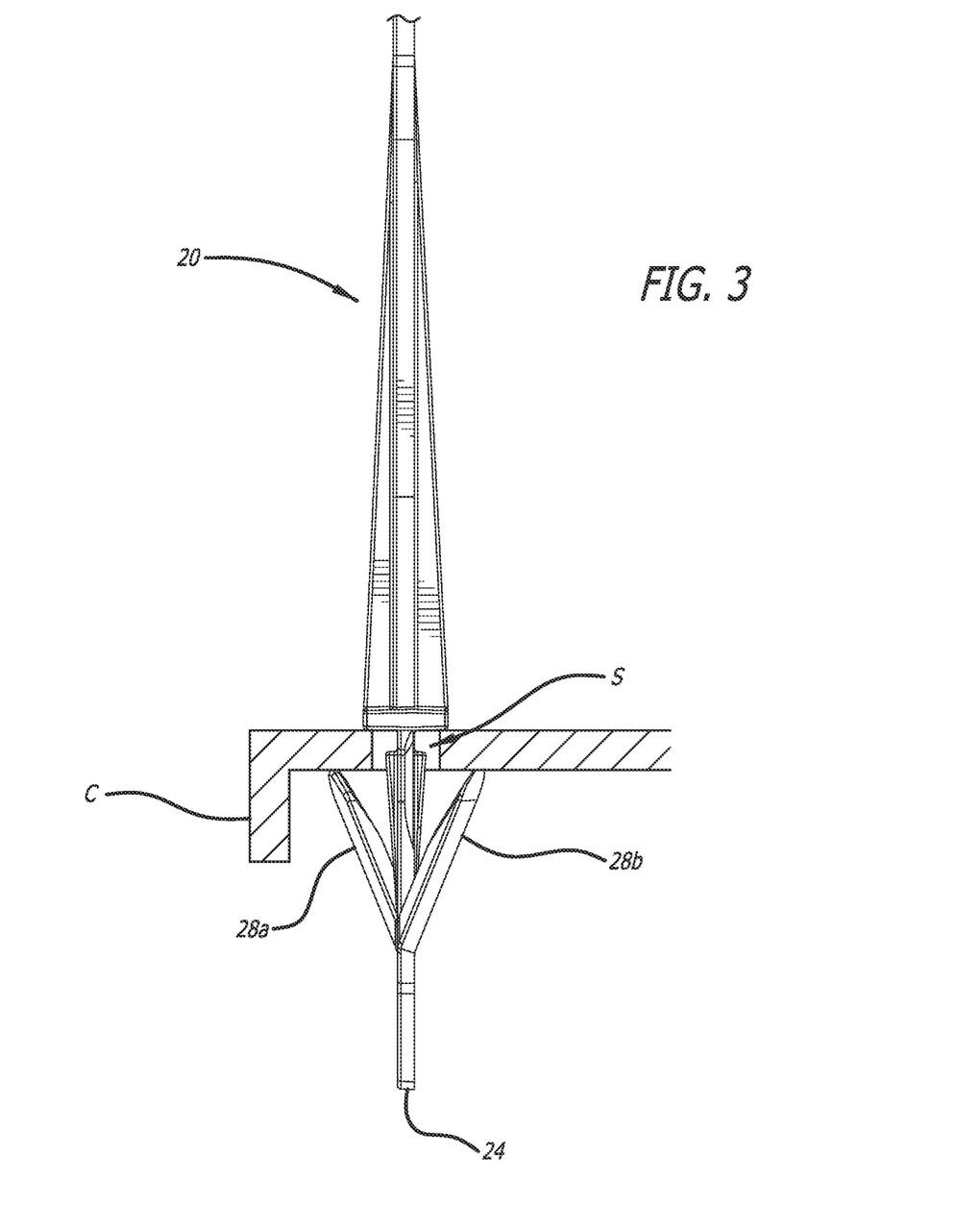
FIG. 3 is a cross sectional view along lines 3-3 of FIG. 2.

Referring to FIGS. 2 and 3, plant stake and display tag holder assembly 10 is shown inserted into container C. Tip 24 is inserted into slit S of container C such that wings 28a and 28b pass there through and are oriented at an angle to the longitudinal axis of the stem 20 and offset from the perimeter of slit S to bear upon the underside of container C so that it may not easily be withdrawn from container C.

In preferred embodiments, tip 24 of stem 20 is inserted through slit S in a generally downward direction until wings 28a and 28b exit slit S and engage the underside of the container C adjacent slit S. In this manner, plant stake and display tag holder assembly 10 is maintained in a generally upwardly direction extending above container C. The printed area of the display tag 30 is readily visible from the side of container C so that the display tag 30 is not obscured by the plant P within container C. Generally, slit S is positioned at the top end of the container C.

As shown in FIGS. 1A through 3, an embodiment of container C is a nursery container with a slit S formed in the rim portion of the side wall above a soil line. Wings 28a and 28b preferably engage the underside of the rim portion at the slit S to resist removal of plant stake and display tag holder 10 from container C without damaging display tag 30 or container C.

Figure 9:
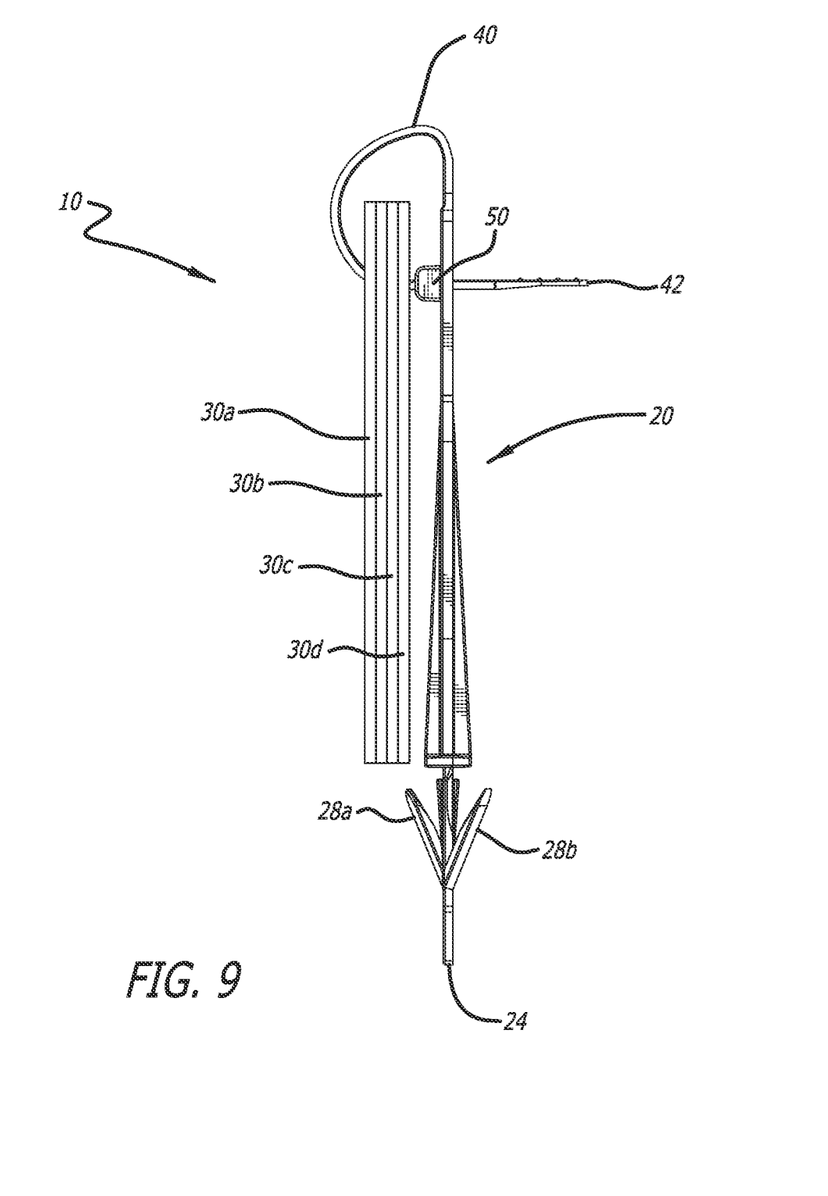
FIG. 9 is a right side elevation view of the plant stake and display tag holder in accordance with an embodiment of the present invention with multiple display tags in the normal resting position.

Referring to FIG. 9, if desired more than one display tag 30 may be attached to loop 40 and held in place by the plant stake assembly 10. This allows additional information that may be desirable to the consumer provided by either the manufacturer or the seller of the nursery item directed to the consumer. The multiple display tags 30 move freely relative to the loop 40 and may be easily moved to be viewable by the consumer so that all sides of the tags can be easily read while remaining attached to plant stake assembly 10.

In preferred embodiments of the invention, container C is a typical nursery container for holding soil D and a plant P during growing, shipping and handling of the plant. Nursery container C includes a bottom wall, a side wall, and a rim portion. Container C can be made from various materials using conventional manufacturing processes. Suitable containers are made from thermoplastic materials, such as high density polyethylene, by injection molding, blow molding, thermoforming or rotational molding. The containers can be made using virgin plastic resin, recycled plastics, and combinations thereof.

Slit S can be molded in rim portion during manufacture of the container when the container is made by injection molding. Alternatively, slit S can be cut after manufacture using a suitable cutting tool regardless of the manufacturing process. Slit S can be formed by cutting or piercing with a suitable tool since this produces a narrow slit with a minimum opening and remains substantially closed until pushed open by the user to insert the tag. The narrow slit then closes around the tag to engage the tag and resist separation. The cut slit further remains substantially closed to reduce loss of water when the plant is irrigated. Alternatively, the slit can be formed by punching with a suitable cutting tool and die.

It should be understood that aspects of the embodiments herein generally may be interchanged in whole or in part. The disclosure further includes the individual parts and/or combinations/subassemblies, methods of making the parts, methods of assembling the parts and methods of using the plant display stake and tag holder.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the broad scope of the following claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A plant stake for holding a display tag for use with a plant container having an insertion slot, the plant stake and display tag holder comprising:
    a stem having a top portion, a bottom portion, and a longitudinal axis passing therethrough, the bottom portion terminating at an insertion end configured to be inserted into the slot of the plant container, the insertion end having an arrow-shaped configuration with two wing portions, each of the wing portions being angled relative to the longitudinal axis of the stem and being at least in part flexible relative to the stem, wherein after insertion of the insertion end into the slot of the plant container the wing portions contact the plant container such that the insertion end holds the stem in an upright position and prevents movement of the stem relative to the plant container to hold the plant stake securely in place and lock into place to hold the plant stake upright and secured to the plant container; and
    a display tag holder including a loop portion for connecting at least one display tag to the stem, the loop portion extending from the top portion of the plant stake and terminating into a tip, the stem having an opening though which at least a portion of the tip of the loop portion is inserted into to form a closed loop proximate the top portion of the stem, and then the tip of the loop portion is inserted into the opening of a display tag before the loop is closed, the display tag freely moves along the closed loop and remains attached the plant stake.

2. The plant stake of claim 1, wherein the loop portion is flexible at least in part.

3. The plant stake of claim 1, wherein the stem includes a stop forming a shoulder having a dimension transverse to the longitudinal axis of the stem greater than a maximum dimension of the insertion slot of the plant container.

4. The plant stake of claim 1, wherein the display tag is held above the soil line of the plant container.

5. The plant stake of claim 1, wherein the stem includes a generally flat tab between the top portion and the bottom portion of the stem.

6. The plant stake of claim 5, wherein the stem includes a stop forming a shoulder between the tab and the insertion end of the stem.

7. The plant stake of claim 1, wherein the loop portion includes a stop between the top portion of the stem and the tip of the loop portion, the stop having a dimension larger than the opening in the stem portion.

8. The plant stake of claim 1, wherein the stem includes a locking mechanism and the tip of the loop portion inserts into the locking mechanism to close the loop portion.

9. The plant stake of claim 8, wherein the locking mechanism includes a tab for connecting with the loop portion and securing the loop portion to the stem when the loop portion is inserted into the opening of the stem.

10. The plant stake of claim 9, wherein the loop portion includes one or more ridges proximate the tip of the loop portion, the ridges configured to interdigitate with the tab of the locking mechanism.

11. The plant stake of claim 1, wherein the wings are oriented at an approximately 45 degree angle to the longitudinal axis of the stem.

12. The plant stake of claim 1, further comprising a display tag having a body portion with a front surface and a back surface opposite the front surface, the body portion including the opening for receiving the loop portion, at least a portion of at least one of the front surface and the back surface including a display area for containing viewable information.

13. The plant stake of claim 12, wherein the display area of the display tag includes a printing area for receiving printed indicia.

14. The plant stake of claim 1, wherein the insertion slot of the plant container has a length and a width, the width being less than its length and the wing portions of the stem are spaced apart greater than the width of the insertion slot, the wing portions being flexible toward each other during insertion to fit into the insertion slot and wherein after having passed through the insertion slot the wing portions spring back to their un-flexed position to be spaced apart wider than the insertion slot and bear upon an underside of the plant container adjacent to the insertion slot to prevent unwanted separation of the plant stake and display tag holder from the plant container.

15. The plant stake of claim 1, wherein the wing portions are oriented at an angle of approximately 30 to 60 degrees to the longitudinal axis of the stem.

16. The plant stake of claim 15, wherein at least a portion of each of the wing portions, respectively, being in a plane that is at angle to a plane passing through the longitudinal axis of the stem and the insertion end.

17. The plant stake of claim 16, wherein the at least a portion of the wing portions being in different planes, each said planes being at angle to the plane passing through the longitudinal axis of the stem and the tip.

18. The plant stake of claim 16, wherein the at least a portion of the wing portions being in the same plane, said plane being at angle to the plane passing through the longitudinal axis of the stem and the tip.

19. The plant stake of claim 1, further comprising at least one display tag secured to the stem by the loop portion.

20. The plant stake of claim 1, further comprising a plurality of display tags secured to the stem by the loop portion.

* * * * *